J. J. KAUBLE.
DUST AND WATER PROOF BOXING.
APPLICATION FILED MAY 27, 1913.
1,113,445.
Patented Oct. 13, 1914.
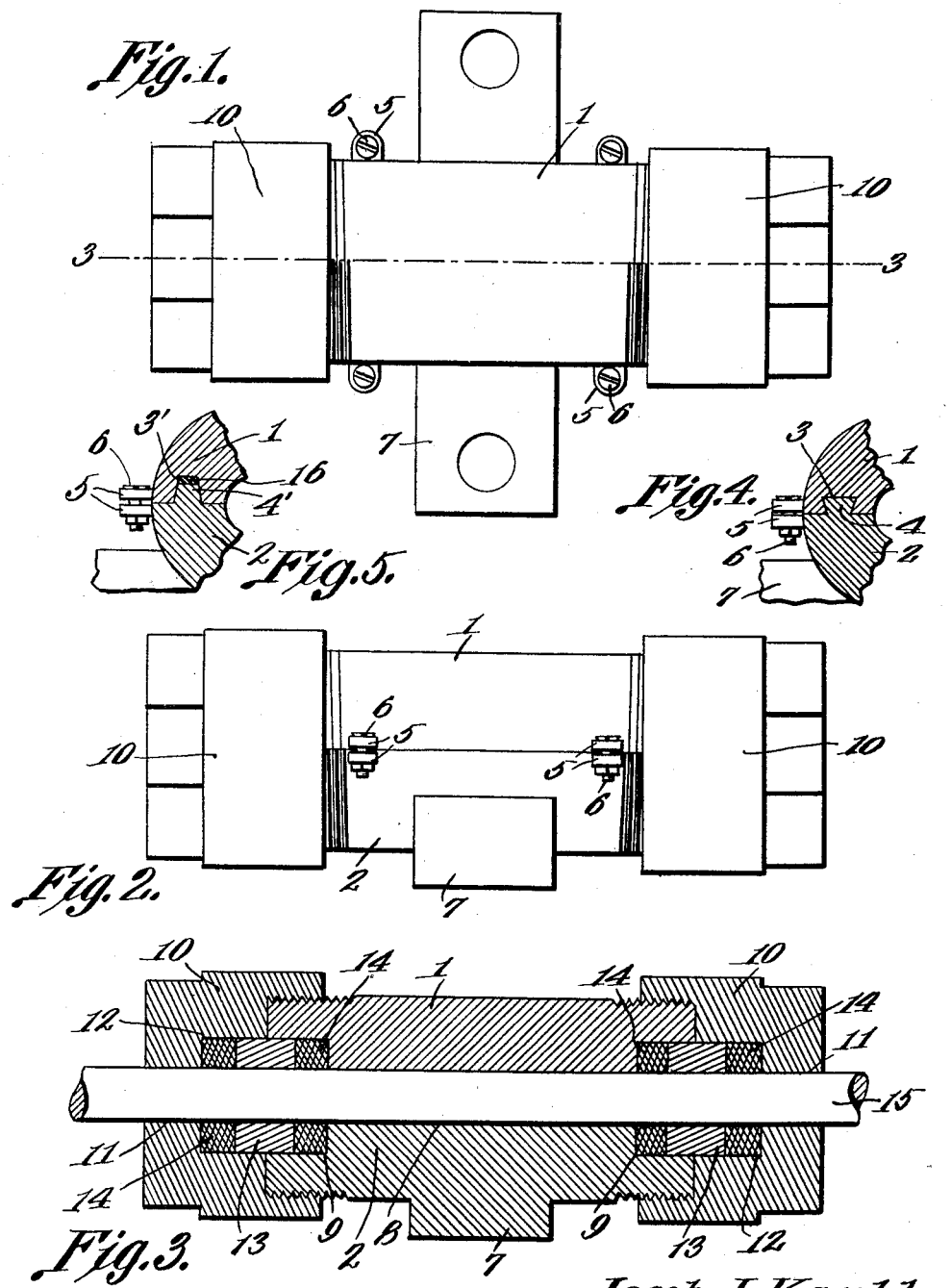
Witnesses
Jacob J. Kauble,
Inventor
by C. A. Snow & Co.
Attorneys

UNITED STATES PATENT OFFICE.

JACOB J. KAUBLE, OF REELSVILLE, INDIANA.

DUST AND WATER PROOF BOXING.

1,113,445.  Specification of Letters Patent.  Patented Oct. 13, 1914.

Application filed May 27, 1913.  Serial No. 770,246.

*To all whom it may concern:*

Be it known that I, JACOB J. KAUBLE, a citizen of the United States, residing at Reelsville, in the county of Putnam and State of Indiana, have invented a new and useful Dust and Water Proof Boxing, of which the following is a specification.

The present invention appertains to shaft bearings or boxings, and aims to provide a novel and improved dust and water proof device of that character.

It is also the object of the present invention to provide a device of the character indicated which shall be comparatively simple, compact, substantial, durable and inexpensive in construction, as well as efficient in its use.

With the foregoing and other objects in view, which will be apparent as the description proceeds, the present invention resides in the combination and arrangement of parts and in the details of construction hereinafter described and claimed, it being understood that changes in the precise embodiment of the invention can be made within the scope of what is claimed without departing from the spirit of the invention.

The invention has been illustrated in its preferred embodiment in the accompanying drawing, wherein:—

Figure 1 is a plan view of the boxing, Fig. 2 is a side elevation thereof, Fig. 3 is a longitudinal section taken on the line 3—3 of Fig. 1. Fig. 4 is a sectional detail, Fig. 5 is a sectional detail, similar to Fig. 4, of a modification.

In carrying out the invention, there is provided a sleeve or bearing comprising the upper and lower halves or sections 1 and 2, the edges of which are provided with the respective interlocking dove-tailed grooves 3 and dove-tailed tongues 4, spaced from the inner and outer surfaces of the bearing, whereby the sections may be slid endwise into engagement. The longitudinal sections 1 and 2 are provided with ears 5 at their edges, the ears being connected by draft bolts 6 to lock the sections against longitudinal movement and to hold the external threads of the ends of the sections in alinement. The lower section 2 is preferably provided with the foot or base 7 in order to permit the boxing to be secured to a suitable support.

If desired, the sleeve or bearing may be constructed of one piece, although the sectional bearing is of advantage, in that the same may be opened for the introduction of the shaft, while a solid bearing would necessitate the endwise insertion of the shaft through the bearing.

The bore 8 of the bearing or sleeve is provided with the counter bores or sockets 9 at its ends, and socket nuts or caps 10 are threaded onto the ends of the bearing. The socket nuts 10 are provided with the bores or apertures 11 alining with and of the same diameter as the bore 8 of the bearing, the bores 11 having the counter bores or sockets 12 at their inner ends complementing the counter bores or sockets 9 of the bearing, the counter bores 9 and 12 being preferably of like diameter. Glands or collars 13 of uniform diameter are disposed partially within the respective counter bores 9 and 12, packing 14 being disposed between the respective glands and the bottoms of the respective counter bores 9 and 12, in order that when the socket nuts 10 are tightened, the packing will be compressed at four points against the shaft 15 journaled through the bore 8. The counterbores of the nuts or caps 10 form shoulders which are seatable against the ends of the sleeve or bearing, which is of manifest advantage, and the openings of the glands or collars 13 are in alinement with and of the same diameter as the bores of the sleeve or bearing and the nuts or caps 10.

The shaft 15 will be free to rotate within the boxing and the boxing may be provided with an oil duct for lubricating the shaft, it being observed that the double packing 14 at each end will effectively exclude the ingress of dust, water and other extraneous matter into the boxing. It is to be observed that the respective packing rings 14 are disposed to the respective sides of the abutting portions of the bearing and socket nut, the glands 13 fitting into both of the counter bores 9 and 12.

The improved boxing may be employed for divers purposes, which will be apparent to those skilled in the art, and carries the objects aimed at in a satisfactory manner.

As illustrated in Fig. 5, the upper section 1 is provided with an ordinary groove 3' in its head, it being understood that one of the said grooves is provided in each head of the section 1, while the corresponding edge of the lower section 2 is provided with the rib 4′ to engage in the respective groove 3′ of the other section. With the pipe or joint, a rubber or compressible strip 16 is preferably disposed or seated within the groove 3′, so that the said strip will be compressed between the bottom of the groove and the rib 4′ to provide a tight joint. With this form, it will be observed that the sections may be readily brought together within a small compass, it not being necessary to slide the sections into engagement endwise.

It is to be understood, also, that suitable means may be provided for oiling the shaft.

What is claimed is:—

1. A boxing embodying a bearing comprising longitudinal sections, the edges of the sections having interengaging tongues and grooves spaced from the inner and outer surfaces of the bearing, the ends of the bearing having external threads, means connecting the sections for holding the threads thereof in alinement, apertured caps threaded over the ends of the bearing, packing means disposed between the ends of the bearing and the caps, and means carried by one section of the bearing for supporting the boxing.

2. A boxing embodying a bearing having its terminals counterbored, socket nuts threaded over the ends of the bearing and having counterbores complementing and of the same diameter as the aforesaid counterbores, the counterbores of the nuts forming shoulder seatable against the ends of the bearing, the nuts having apertures alined with and of the same diameter as the bore of the bearing, glands of uniform diameter fitting in the complementing counterbores and extending partially into each, and packing disposed between the glands and the bottoms of the counterbores of both the bearing and nuts, the openings of the glands being in alinement with and of the same diameter as the bore of the bearing.

In testimony that I claim the foregoing as my own, I have hereto affixed my signature in the presence of two witnesses.

JACOB J. KAUBLE.

Witnesses:
 HENRY BICKNELL,
 ALLIE C. RUARK.

Copies of this patent may be obtained for five cents each, by addressing the "Commissioner of Patents, Washington, D. C."